US011473156B2

(12) United States Patent
Nungesser et al.

(10) Patent No.: US 11,473,156 B2
(45) Date of Patent: Oct. 18, 2022

(54) CHROME-FREE LEATHER RETANNING

(71) Applicant: Rohm and Haas Company, Collegeville, PA (US)

(72) Inventors: Edwin Nungesser, Horsham, PA (US); Andrew Hejl, Landsdale, PA (US); Caiyun Li, Shanghai (CN); Pu Luo, King Of Prussia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1158 days.

(21) Appl. No.: 15/777,358

(22) PCT Filed: Dec. 18, 2015

(86) PCT No.: PCT/CN2015/097807
§ 371 (c)(1),
(2) Date: May 18, 2018

(87) PCT Pub. No.: WO2017/101093
PCT Pub. Date: Jun. 22, 2017

(65) Prior Publication Data
US 2020/0385825 A1   Dec. 10, 2020

(51) Int. Cl.
| | |
|---|---|
| *C14C 11/00* | (2006.01) |
| *C08K 3/08* | (2006.01) |
| *C08K 3/32* | (2006.01) |
| *C09D 133/08* | (2006.01) |
| *C09D 175/04* | (2006.01) |
| *C14C 3/16* | (2006.01) |
| *C14C 3/22* | (2006.01) |
| *C14C 3/28* | (2006.01) |
| *C08G 18/08* | (2006.01) |
| *C09D 133/06* | (2006.01) |
| *C14C 3/10* | (2006.01) |
| *C09D 7/40* | (2018.01) |

(52) U.S. Cl.
CPC ........ *C14C 11/003* (2013.01); *C08G 18/0819* (2013.01); *C08K 3/08* (2013.01); *C08K 3/32* (2013.01); *C09D 7/70* (2018.01); *C09D 133/06* (2013.01); *C09D 133/08* (2013.01); *C09D 175/04* (2013.01); *C14C 3/10* (2013.01); *C14C 3/16* (2013.01); *C14C 3/22* (2013.01); *C14C 3/28* (2013.01); *C14C 11/006* (2013.01); *C08K 2003/0893* (2013.01); *C08K 2003/329* (2013.01)

(58) Field of Classification Search
CPC ........ C08G 18/0819; C08K 3/08; C08K 3/32; C08K 2003/0893; C08K 2003/329; C09D 175/04; C09D 133/08; C09D 133/06; C09D 7/70; C14C 11/003; C14C 11/006; C14C 3/16; C14C 3/22; C14C 3/28; C14C 3/10
See application file for complete search history.

(56) References Cited

U.S. PATENT DOCUMENTS

| | | |
|---|---|---|
| 3,744,969 A | 7/1973 | Alps et al. |
| 4,491,612 A | 1/1985 | Fischer |
| 4,596,581 A | 6/1986 | Hohr et al. |
| 5,221,284 A | 6/1993 | Meister et al. |
| 5,316,860 A | 5/1994 | Stewart et al. |
| 5,723,182 A | 3/1998 | Choi et al. |
| 6,290,866 B1 | 9/2001 | Lesko et al. |
| 7,829,626 B2 | 11/2010 | Chiou et al. |
| 8,530,362 B2 | 9/2013 | Nungesser et al. |
| 2016/0160071 A1* | 6/2016 | Luo .......................... C08F 8/42 |
| | | 525/164 |

FOREIGN PATENT DOCUMENTS

| | | | | |
|---|---|---|---|---|
| CN | 1165864 A | 11/1997 | | |
| CN | 103276119 A | 9/2013 | | |
| EP | 2284285 A1 | 2/2011 | | |
| EP | 2993195 A1 * | 3/2016 | ........... | C08G 18/022 |
| JP | H073300 A | 1/1995 | | |
| JP | 2013040259 A | 2/2013 | | |
| JP | 2013255532 A | 12/2013 | | |
| WO | WO-2017025213 A1 * | 2/2017 | ........... | C08G 18/022 |

OTHER PUBLICATIONS

Kim, Dong Ok, Jin, Jeong Hee; Morphology and Mechanical Property Variations of Single Polymer Particles; Journal of Applied Polymer Science, vol. 104 (4) 2007.
International Search Report; International Application No. PCT/CN2015/097807; International Filing Date Dec. 18, 2015; dated Sep. 14, 2016; 5 pages.
Written Opinion of the International Searching Authority; International Application No. PCT/CN2015/097807; International Filing Date Dec. 18, 2015; dated Sep. 14, 2016; 3 pages.

* cited by examiner

*Primary Examiner* — Patrick D Niland
(74) *Attorney, Agent, or Firm* — Cantor Colburn LLP

(57) ABSTRACT

A method for forming chrome-free retanned leather including: (a) contacting wet white (chrome-free tanned hide) with a retanning mixture comprising from 2% to 15%, by solids weight, based on the wet weight of the wet white, of an amphoteric polymer composition comprising amine functional units and acid functional units; and (b) applying a polymeric overcoat containing an acrylic copolymer with one or more metal transition elements, with a thickness of no greater than 100 microns, to the retanned wet white, is provided. The present invention also provides a chrome-free retanned leather formed by the method.

20 Claims, No Drawings

CHROME-FREE LEATHER RETANNING

This invention relates to chrome-free leather retanning More particularly this invention relates to a method for forming chrome-free retanned leather including: (a) contacting wet white (chrome-free tanned hide) with a retanning mixture comprising from 2% to 15%, by solids weight, based on the wet weight of the wet white, of an amphoteric polymer composition comprising amine functional units and acid functional units; and (b) applying a polymeric overcoat containing an acrylic copolymer with one or more metal transition elements, with a thickness of no greater than 100 microns, to the retanned wet white. The present application also relates to chrome-free retanned leather formed by the method.

The treatment of hides and skins to make leather involves a number of interdependent chemical and mechanical operations. These operations may be divided into a sequence of wet end steps, i.e., process steps under wet conditions, followed by a sequence of dry steps, i.e., process steps under dry conditions. A typical leather making process involves the following sequence of wet-end steps: trimming and sorting, soaking, fleshing, unhairing, bating, pickling, tanning, wringing, splitting and shaving, retanning, coloring, fatliquoring and setting out. These wet-end steps are followed by a sequence of dry steps, such as, drying, conditioning, staking, buffing, finishing, plating, measuring and grading. A description of each of these operations is provided in Leather Facts, New England Tanners (1972).

The present invention is involved with steps that take place after primary tanning; namely retanning and coating of the retanned leather. The object of primary tanning is to convert the hide, pelt or skin to a stable non-spoilable material. After primary tanning, the leather is retanned. Chrome-free tanned skins/hides, referred to herein as "wet white", may be retanned by using a variety of naturally derived materials including extracts from vegetables or plants, and synthetic tanning agents known as "syntans", or combinations thereof. After retanning or, if desired, during retanning, the hide is colored with colorants, such as, acid dyes, mordant dyes, direct dyes, metalized dyes, soluble sulfur dyes, and cationic dyes. The leather tanning industry is searching for alternative treatments to produce chrome-free tanned leathers.

U.S. Pat. No. 4,596,581 discloses a tanning process which imparts dyeing properties and good fullness to mineral-tanned leathers, even when anionic tanning agents and retanning agents are used. The disclosed process utilizes an amphoteric retanning polymer comprising a water-soluble amino- and carboxyl-containing polymer with a certain ratio of tertiary amino groups to carboxyl groups. European Patent Publication No. 2284285 A1 discloses application of a coating film to a tanned natural leather. EP2284285 A1 discloses a coating co-polymer of acrylic-urethane of a specific 105 modulus. U.S. Pat. No. 5,723,182 discloses a method for coating leather with an aqueous coating composition containing a multi-stage emulsion polymer which has been contacted with a divalent metal oxide, hydroxide, or carbonate.

There is a need for chrome-free tanned leather that compares favorably to traditionally treated leathers in appearance, feel and performance The present invention provides a method for forming chrome-free retanned leather comprising: (a) preparing a chrome-free tanned leather hide; (b) contacting the chrome-free tanned leather with a retanning mixture comprising from 2% to 15%, by solids weight, based on the wet weight of the chrome-free tanned leather hide, of an amphoteric polymer composition comprising amine functional units and acid functional units; and (c) applying a polymeric overcoat containing an acrylic copolymer with one or more metal transition elements, with a thickness of no greater than 100 microns, to the retanned leather. The present invention further provides a chrome-free retanned leather formed by the above method.

By "chrome-free" herein is meant that the leather is free from the element Chromium in any of its oxidation states in any of its compounds; chrome-free does not exclude de minimus levels of chromium, levels such as may be consistent with legislative or regulatory definitions of chrome-free. Preferably the wet-white leathers are tanned by use of a non-cationic, organic tanning chemistry. More preferably the organic tanning chemistry comprises carbonyl moieties, which are preferably aldehydes and more preferably dialdehydes such as glutaraldehyde. In addition to being chrome-free, the tanned leather may also be free of other mineral tanning agents including aluminum, zirconium, salts of the same, or combinations thereof. The wet-white leathers and/or other mineral-free tanned leathers require particular retanning agents on account of the different chemistries employed. Retanning agents for chrome-free tanned leather are required in order to provide leathers with good softness and dye intensity. Retanned leathers are then sometimes further coated to impart additional properties to the retanned leather.

The wet white (chrome-free and/or mineral-free tanned hide) is contacted with a retanning mixture comprising from 2% to 15%, by solids weight, based on the wet weight of the wet white, of an amphoteric polymer composition comprising amine functional units and acid functional units. Preferably the retanning mixture comprising from 3% to 15%, by solids weight, based on the wet weight of the wet white, of the amphoteric polymer composition. Preferably the retanning mixture comprising from 3% to 10%, by solids weight, based on the wet weight of the wet white, of the amphoteric polymer composition. Preferably the amphoteric polymer has one or more of the following attributes:

(a) a molecular weight (Mw) of 15,000 or less, as determined by size exclusion chromatography;
(b) no more than 25%, by weight based on the dry weight of the polymer composition, of an oligomer having a Mw of 1000 or less, as determined by size exclusion chromatography;
(c) a positive charge at a pH of less than 5;
(d) a negative charge at a pH of great than 7;
(e) at least 10%, based on the dry weight of the polymer composition, of one or more amine functional monomers, in polymerizable form;
(f) at least 10%, based on the dry weight of the polymer composition, of one or more acid functional monomers, in polymerizable form; and
(g) a molar ratio of acid functionality to amine functionality of 10:20 to 20:10, more preferably 15:20 to 20:15.

The amphoteric polymer composition comprises from 10 to 50%, preferably 20-50%, more preferably 40-50% by weight based on the weight of the polymer, of an amine monomer, in polymerized form, according to structure 1.

Structure 1

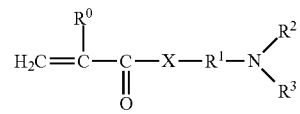

Wherein $R^0$ is H, $CH_3$ or $CH_2CH_3$; $R^1$ is $CH_2CH_2$, $CH_2CH(CH_3)$, or $CH_2CH_2CH_2$ or $CH(CH_3)CH_2CH_2$, $CH_2CH_2CH_2$, $CH(CH_2CH_3)CH_2$, $CH(CH_3)CH(CH_3)$; $R^2$ and $R^3$ are, independently, H, $CH_3$, $CH_2CH_3$ or C3-C12 and may be linear, branched, alkyl, aromatic, or cyclic; or quaternary salt analogues thereof; X is O or $NR^4$, where R4 is H, $CH_3$, $CH_2CH_3$ or C3-C12 and may be linear, branched, alkyl, aromatic, or cyclic. Preferably X is O.

The amphoteric polymer composition comprises from 10 to 50%, preferrably 20-50%, more preferrably 20-30% by weight based on the weight of the polymer, of an acid monomer, in polymerized form, according to structure 2.

Structure 2

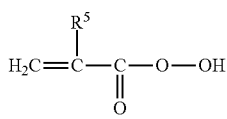

Wherein R5 is is H or CH3.

Optionally, the amphoteric polymer composition comprises from 10 to 80%, preferably 10-40%, more preferably 15-30% by weight based on the weight of the polymer, of a nonionic monomer, in polymerized form, according to structure 3.

Structure 3

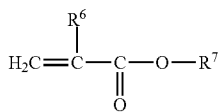

Wherein $R^6$ is is H, CH3 and $R^7$ is an alkyl or cycloalkyl moiety. Suitable nonionic monomers include acrylic and vinyl nonionic monomers. Acrylic nonionic monomers may include, for example, one or more C1-30 alkyl(meth)acrylate monomer, C5-30 cycloalkyl (meth) acrylate, or C5-30 (alkyl)aryl (meth)acrylate monomer, including, for example, methyl methacrylate, isodecyl methacrylate and low Tg (meth)acrylic monomers. Suitable low Tg (meth)acrylic monomers include but are not limited to ethyl acrylate (EA), butyl acrylate (BA), t-butyl acrylate (t-BA), 2-ethylhexyl acrylate (2-EHA), lauryl acrylate, lauryl methacrylate, cetyl (meth)acrylate, eicosyl (meth) acrylate, cetyleicosyl (meth) acrylate, behenyl (meth)acrylate, methyl acrylate, and butyl methacrylate (BMA).

Other chemicals may be incorporated with the retanning mixture to confer certain performance properties. The other chemicals may include, independently, fatliquoring agents, pigment(s), emulsifiers, surfactants, lubricants, coalescing agents, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, dyes, water-repellants, and anti-oxidants.

In a typical retanning process the hides are heated for a certain time in contact with the retanning mixture for a sufficient time to effect reaction, and then dried to produce the retanned leather. Typically, the contacted wet white were drummed for from 30 min to 600 min at 25° C. to 60° C., and then dried for 24 hr at ambient temperature.

The retanned leather is then coated by applying a polymeric overcoat containing an acrylic copolymer with a metal transition element, with a thickness of no greater than 100 microns, to the retanned wet white. The acrylic copolymer is preferably an aqueous emulsion polymer that is a water-based acrylic copolymer, meaning a copolymer including a predominant amount of copolymerized (meth)acrylic esters. As used herein, the use of the term "(meth)" followed by another term such as acrylate refers to both acrylates and methacrylates. For example, the term "(meth)acrylate" refers to either acrylate or methacrylate.

Preferably the acrylic copolymer has a calculated glass transition temperature ("Tg") of zero degrees Celsius (0° C.) or less, arrived at by selection of the monomers and amounts of the monomers to achieve the desired polymer Tg, as is well known in the art. Tgs of the polymers are calculated herein by using the Fox equation (T.G. Fox, Bull. Am. Physics Soc., Volume 1, Issue No. 3, page 123(1956)), that is, for calculating the Tg of a copolymer of monomers M1 and M2, $1/Tg(\text{calc.}) = w(M1)/Tg(M1) + w(M2)/Tg(M2)$, wherein Tg(calc.) is the glass transition temperature calculated for the copolymer,
w(M1) is the weight fraction of monomer M1 in the copolymer,
w(M2) is the weight fraction of monomer M2 in the copolymer,
Tg(M1) is the glass transition temperature of the homopolymer of M1,
Tg(M2) is the glass transition temperature of the homopolymer of M2, and all temperatures being in K.

The glass transition temperature of homopolymers may be found, for example, in "Polymer Handbook", edited by J. Brandrup and E. H. Immergut, Interscience Publishers. In embodiments where two or more different emulsion polymers or emulsion polymers including multiple phases such as, for example, core/shell polymers are used then the calculated Tg of the emulsion polymer shall be calculated based on the overall composition of the polymeric components.

To insure that the polymeric overcoat provides low tack coatings, the acrylic copolymer, which preferably has carboxylic acid groups therein, or the corresponding stage of a multistage polymer, should have when not crosslinked with divalent metal, a weight average molecular weight of from 200,000 to 10,000,000, preferably 300,000 or more, or, more preferably, 400,000 or more, as measured by Gel Permeation Chromatography using polystyrene standards.

Preferably the acrylic copolymer contains phosphorus acid monomer units copolymerized therein. When the acrylic copolymer contains phosphorus acid monomer units copolymerized therein, preferably it is in the range of greater than 0 to 5% by weight of the acrylic copolymer, more preferably in the range of greater than 0 to 3.5% by weight of the acrylic copolymer, and most preferably in the range of 0.5 to 3.5% by weight of the acrylic copolymer. The phosphorus acid monomer contains at least one ethylenic unsaturation and a phosphorus acid group. The phosphorus acid monomer may be in the acid form or as a salt of the phosphorus acid groups. Examples of phosphorus acid monomers include:

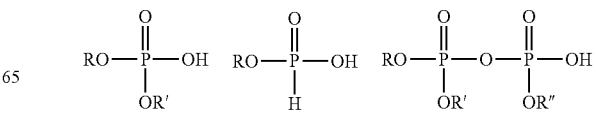

-continued

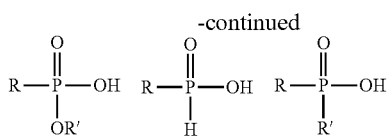

wherein R is an organic group containing an acryloxy, methacryloxy, or a vinyl group; and R' and R" are independently selected from H and a second organic group. The second organic group may be saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl (meth)acrylates including 2-hydroxyethyl (meth)acrylate, 3-hydroxypropyl (meth)acrylates, and the like. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy)phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth)acrylate, 3-phosphopropyl (meth) acrylate, and 3-phospho-2-hydroxypropyl (meth) acrylate.

The polymeric overcoat contains one or more metal transition elements. Preferably the metal transition element in the polymeric overcoat is zinc. The emulsion polymer portion of the polymeric overcoat is contacted with a transition metal oxide, hydroxide, or carbonate at pH less than pH=9, preferably at pH=3-6, in an amount greater than 0.20 equivalent, preferably greater than 0.50 equivalent, of transition metal per equivalent of copolymerized carboxylic acid monomer in the emulsion polymer according to the process disclosed in U.S. Pat. No. 5,221,284. The oxides, hydroxides, and carbonates of zinc, aluminum, tin, tungsten, and zirconium are preferred for low cost, low toxicity, and low color in the dried coating. Zinc oxide is more preferred. The transition metal oxide, hydroxide, or carbonate may be added as a slurry in water, optionally with an added dispersant such as, for example a low molecular weight polymer or copolymer of (meth)acrylic acid. The transition metal oxide, hydroxide, or carbonate may be added during the polymerization process or after the polymerization has been completed. Alternatively, the transition metal may be added in a soluble form such as a solution of zinc ammonium carbonate added after the formation of the emulsion polymer and neutralization of the emulsion polymer to a pH greater than 8.

Preferably the polymeric overcoat further comprises a urethane polymer (polyurethane or PU) dispersion blended in with the acrylic copolymer. Commercially purchased PU polymers can be used in the present invention. Preferably the polymeric overcoat comprises from 25 to 75 wt. %, based on the total solids weight of the acrylic copolymer, of a polyurethane having a polymeric Tg determined by differential scanning calorimetry (DSC), scanning from a temperature of −90° C. to 150° C. at a heating rate of 20° C/min, of less than −20° C. or as low as −70° C., preferably less than −30° C., or, more preferably less than −40° C.

The polyurethanes of the present invention can be any polyurethane having the requisite Tg by DSC measured at 10° C./minute made by conventional methods from one or more diisocyanate, e.g. isophorone diisocyanate or tetramethylene diisocyanate, or a polyisocyanate, and one or more polyol. Suitable polyols for making the polyurethane of the present invention can be any having the requisite Tg (DSC), such as a polyether polyol, polycarbonate polyol, or polyester polyol having a molecular weight of 5,000 or less, or of 2,000 or less. Such polyols are preferably linear and have two hydroxyl groups, one at each end.

Suitable polyisocyanates for use in making the polyurethane of the present invention are well known in the art and include aliphatic, cycloaliphatic and/or aromatic isocyanates containing at least 2 isocyanate groups per molecule. Suitable polyurethanes are commercially available, such as the Bayderm™ polyurethanes from Lanxess, Leverkusen, Del., or can be formed by methods conventional in the art. Polyurethane polymers are generally made by reacting an organic polyisocyanate(s) with an organic compound(s) containing isocyanate-reactive groups, particularly a polyol. The reaction may be carried out in the presence of a catalyst such as organic tin compounds and/or tertiary amines.

The polyurethanes are made into aqueous polyurethane dispersions by conventional means known in the art, and may be anionic salt functional, non-ionic or anionic polyurethane dispersions. In one example, the polyurethane dispersion may be an anionic polyurethane dispersion prepared by reacting one or more polyol with an organic compound having at least one acid group and at least two active hydrogen functionalities, and a polyisocyanate. Suitable organic compounds having at least one acid group and at least two active hydrogen functionalities (hereinafter the "organic compound") include, for example, 2,2-dimethylolacetic acid and 2,2-dimethylolpropionic acid. Examples of acid groups suitable for the organic compound include, carboxylic acid, sulfonic acid, phosphoric, phosphonic acid and the like. Preferred is the carboxylic acid group. Suitable polyurethanes have a weight average particle size (BI-90) of from 20 to 500 nm, preferably, from 30 to 200 nm. Suitable polyurethanes have a weight average molecular weight (Mw) of 100,000 to 3,000,000, or, preferably, from 150,000 to 1,500,000.

Most preferably the polymeric overcoat further comprises from 5 to 20% by weight based on the solid content of the film forming polymer(s), of soft, organic, solid spherical particle beads with a particle size of 3 to 10 microns.

The spherical beads are organic and may be prepared by any of a number of method known in the art, including emulsion polymerization, seeded growth, and suspension polymerization processes. The spherical beads may be prepared in a single stage process or in a multiple step process. Examples of suitable polymers for the spherical beads include polyacrylates, polymethacrylates, polystyrenes, polyacrylamides, polyurethanes, polysiloxanes, polyolefins, polyacrylonitrile, nylons, poly(vinyl esters) (including poly (vinyl acetate) and poly(vinyl versatates)), poly(vinyl halides), and poly(vinylidene halides), and combinations thereof, and copolymers thereof. The spherical polymer beads are preferably crosslinked with a suitable crosslinking group such as allyl methacrylate or divinyl benzene. Preferably at least 60% of the polymeric beads have a diameter in the range of 3 to 10 µm; more preferably, at least 80% of the polymeric beads have a diameter in the range of 4 to 7 µm. Examples of preferred monomers that can be used to prepare the spherical beads include methyl methacrylate, ethyl acrylate, butyl acrylate, ethylhexyl acrylate, styrene, and α-methyl styrene, and combinations thereof.

The spherical beads are preferably solid throughout and preferably compressible. Preferably the compressible bead has a K10 value (the K value at 10% compression) of less than $1.9E+10$ N/m$^2$; preferably a K10 value of less than $1.9E+10$ N/m$^2$ and a ratio of K0/K10 (K0 is K at full compression) of greater than 1.5, more preferably a K10 value of less than $1.9E+10$ N/m$^2$ and a ratio of K0/K10 of greater than 3.0. (K values are disclosed in "Investigation for Surface Morphology and Mechanical Property Variations of Single Polymer Particles", Journal of Applied Polymer Science, Volume 104 (4) 2007, Dong Ok Kim, Jeong Hee Jin; all K values herein are those measured at a compression rate of 0.79 gram-force/sec.).

Mean particle size can be measured using a Disc Centrifuge Photosedimentometer ("DCP") (CPS Instruments, Inc.) that separates modes by centrifugation and sedimentation through a sucrose gradient. The samples are prepared by adding 1-2 drops into DI water (10 mL) containing 0.1% sodium lauryl sulfate. About 0.1 mL of the sample is injected into the spinning disc filled with 15 mL sucrose gradient. Samples are analyzed relative to a polystyrene calibration standard.

The invention in some of its embodiments will now be further described by reference to the following examples. In the examples, the "AP" identifier refers to amphoteric polymers; the "RT" identifier refers to retanning formulations; the "BP" identifier refers to base polymers used to form polymeric overcoat formulations; the "PO" identifier refers to polymeric overcoat formulations; and the "L" identifier refers to finished leather products, except when referring to trade names.

EXAMPLES

TABLE 1

Product names that are used in the Examples.

| Product Name | Description | Company |
| --- | --- | --- |
| Euderm Nappa Soft S | Soft anti-tack agent and filler | Lanxess GmbH, Leverkusen, DE |
| Euderm Duller SN-02 | Matting agent | Lanxess GmbH, Leverkusen, DE |
| Euderm Black BN | black Pigment | Lanxess GmbH, Leverkusen, DE |
| Bayderm PR MX | Aqueous Polyurethane dispersion | Lanxess GmbH, Leverkusen, DE |
| ACRYSOL RM-1020 | Hydrophobically modified Ethylene Oxide Urethane rheology modifier | The Dow Chemical Company |
| Leukotan 970 | Acrylic syntan | The Dow Chemical Company |
| Baykanol AN2-C | Wetting agent | Lanxess GmbH, Leverkusen, DE |
| Oxalic Acid Dihydrate | pH regulator | Sinopharm Chemical Reagent Co., Ltd. |
| Tanigan PAK | Neutralizing and buffering material | Lanxess GmbH, Leverkusen, DE |
| Sodium formate dihydrate | Neutralizing and buffering material | Sinopharm Chemical Reagent Co., Ltd. |
| Sodium bicarbonate | Neutralizing and buffering material | Shanghai Hongguang Chemical Co., Ltd. |
| Tanigan BN | Retanning replacement syntan | Lanxess GmbH, Leverkusen, DE |
| Tara | Vegetable tannage | Lanxess GmbH, Leverkusen, DE |
| Tanigan F | Syntan | Lanxess GmbH, Leverkusen, DE |
| Baygenal Blank TD | Dyestuff | Lanxess GmbH, Leverkusen, DE |
| Levotan L | Softening and filling polymer | Lanxess GmbH, Leverkusen, DE |
| Eureka 950R | Fat Liquor; | Altas Refinery Inc. |
| Formic acid (HCOOH) | pH regulator | Sinopharm Chemical Reagent Co., Ltd. |
| VAZO 52 | Azo radical initiator | Dupont |
| Bruggolite FF6 | Reductant | Brueggemann Chemical |

Test/Evaluation Methods:

(1) Softness (BLC) testing method is ISO 17235-2002: Leather—Physical and mechanical tests—Determination of softness.

(2) Softness (handling) and fullness, softness and fullness of crusts were ranked by manual handling/feeling. Same criterion was implemented for their evaluation, i.e., higher rank number correlates to higher degree of performance, meaning that Rank 6 is the highest level of performance (the softest and the fullest).

(3) Thickness (%) of crusted were tested and calculated step by step. Thickness test method is ISO2589-2002. The thickness data of the tanned stocks before treating process were measured and recorded as Thickness (1), the thickness data of the crusts after treating process were measured and recorded as Thickness (2). Then the thickness (%) was calculated as below formula:

Thickness (%)=(Thickness (2)−Thickness (1))/Thickness(1)×100

(4) Dye intensity represents the shade/intensity of color especially on leather surface, which was ranked as number 1-6. A number 6 means the deepest color of leathers in the same trial. A higher number shows deeper color.

Application of basecoat onto the leather substrates:

Leather swatches (11.3×3.5 cm) of each of the leather substrate preparations were aligned in a side to side fashion and attached to a single 12"×12" (0.0929 m$^2$) mylar sheet using double sided tape with the grain side of the leather facing away from the mylar sheet. Basecoat was spray applied to the leather to achieve a dry add-on of 32.3-53.8 dry grams basecoat per square meter of leather. The leather was dried in a 90° C. oven for at least 4 minutes.

Evaluation of Coated Leather:

The coated leather was visually assessed for evenness of appearance and rated on a relative scale of 1 to 10 depending on how even the coating appeared on the leather substrate. A low rating indicates a less even distribution of coating. The coated leather was assessed for naturalness using a sterio scope at 10× magnification and rated on a relative scale of 1 to 10 depending on how natural the grain structure was retained after coating. A low rating indicates a less natural appearance of the coated substrate.

Adhesion Testing:

1.4×11 cm pieces were cut from base coated leather. A layer of glue (Super Glue Gel, The Gorilla Company, Cincinnati, Ohio) was applied to the basecoat side of the leather and a 1×10 cm PVC strip (Model STD 112P1, SATRA TECHNOLOGY, Northhamptonshire, United Kingdom) was placed onto the wet glue. A 2228 gram weight was applied to the leather/pvc article and after 3 hours adhesion of the basecoat to the PVC strip was placed into an Adhesion of Finish Tester (SATRA Model STD112) and weight was applied to the leather until adhesion of coating to leather failed. A higher weight value indicates improved adhesion of finish to leather.

AP Example 1: Synthesis of Amphoteric Polymer Composition (45DMAEMA/30MAA/25MMA), MW 2K-10K Ethanol (300 g) was charged to a 3-L reactor and heated to 70° C. An initiator solution of VAZO 52 (2,2'-Azobis(2,4-dimethylvaleronitrile), 5.25 g in 47.25 g ethanol) was charged to the reactor. Immediately after initiator addition a monomer mix containing ethanol (167.87 g), methacrylic acid (157.5 g), methyl methacrylate (131.25 g), N,N-dimethylaminoethyl methacrylate (236.25 g), 2-mercaptoethanol (21.00 g) was fed to the reactor over 60 minutes. When the monomer mix feed was complete it was rinsed to the reactor with ethanol (31.50 g). After rinsing the solution was held for 30 min at 70° C. then heated to 78° C. At 78° C. a solution of VAZO 52 (1.05 g in 9.45 g ethanol) was charged to the reactor and the solution was held for 1 h. After the hold the solution was cooled to 70° C. To the reactor at 70° C. was added hydrogen peroxide (35% in water, 3.75 g), ammonium hydroxide (29% in water, 22.50 g) and water (975 g). The resulting solution was transferred to a separate vessel where the ethanol was removed under vacuum. The resulting ethanol free solution had a solids content of 40.6% and pH of 7.2.

Leather Processing

The stocks, purchased from tannery, were treated by glutaraldehyde, and then were used to evaluate the selected samples retanning performance. The tanned leather stocks were re-weighted. All weights were based on the weight of the leather stock (100% means a weight equal to the weight of the stock in the drum). All chemical addition percentages refer to their weight% based on the weight of the leather stock, unless specially stated.

1) The tanned stock was offere with 300% float, 0.6% Baykanol AN2-C and 0.6% oxalic acid at 35° C. The stock was tumbled at least for 120 minutes until it was totally wet back (the water inside the stock was saturated and the stock became soft). The float pH was measured and the drum was drained.
2) The stock and an added 100% float were neutralized with 2.0% Tanigan PAK, 1.0% sodium formate for 20 minutes, and then added 1.5-1.75% sodium bicarbonate. The mixture was then drummed for at least 2 hours. The stock cross-section was checked to make sure the stocks were neutralized totally. The pH of the neutralization float was monitored and maintained in the range of 5.0-5.5 by offering sodium bicarbonate to the leather in 0.5% and/or 0.25% portions per addition as needed.
3) The drum was drained and the stocks were washed with 300% float at 35° C. for 5 minutes.
4) The drum temperature was raised to 40° C. and an added 100% float into the drum. The comparative samples of Blank (no retanning agent) and commercial product of Leukotan 970 were added as 6% solids weight. As comparison, the selected samples were added as 2%, 4%, 6% and 8% solids weight (the added solids weight of sample was based on the stock weight), drummed for 90-120 minutes.
5) 3% Tanigan BN and 6% Tara were added into the drum to treat the stocks for 20-60 minutes, and then 2% Tanigan F and 3% Baygenal Blank TD (dyestuff) were offered to the stock at 40° C. for 30-60 minutes.
6) The drum temperature was raised to 50° C. and an added 50% float into the drum. 3% Levotan L was added and treated the stocks for 20 minutes and 5% Eureka 950R was offered to the stock for 60-90 minutes.
7) Formic acid was added to the contents of the retanning drum at a level of 0.5 weight % formic acid (85% active concentration). The formic acid was added as 10-25% into the drum to lower the float pH to less than 3.6, continually drummed for 10-30 minutes at room temperature.
8) The treated stock was horsed overnight. On the following day, it was hung on the toggle to be dried.

The frame-dried treated stock (called crust) was adjusted its moisture content to 16-19% by spraying it uniformly with water and sealing it in a plastic bag for 4-24 hours (called conditioning). The resulting conditioned leather was then mechanically softened by a process called staking to provide the suitable leather samples for further testing or evaluation.

Retanning Formulation

The below retanning formulation was used to create retanning Examples 2-5 and retanning Comparative Examples A and B according to the process steps described above.

RT Comparative A utilizes no retanning agent, called as "blank."

RT Comparative B utilizes commercial product Leukotan 970.

RT Example 2 utilizes 2 wt. % of AP Example 1 as the polymer.

RT Example 3 utilizes 4 wt. % of AP Example 1 as the polymer.

RT Example 4 utilizes 6 wt. % of AP Example 1 as the polymer.

RT Example 5 utilizes 8 wt. % of AP Example 1 as the polymer.

TABLE 2

Retanning formulations and steps

| Process | Wt. % | Chemical | Min | REMARKS |
|---|---|---|---|---|
| Strips | | Strips | | Thickness: |
| Stock | | Glutaraldehyde tanned leather Weight (gram) | | 1.4-1.6 mm |
| Refloat | 300 | water@35° C. | | |
| | 0.6 | Baykanol AN2-C | 120 | |
| | 0.6 | Oxalic acid | O/N | pH 3.70 drain |
| | 100 | water@35° C. | | |
| | 2 | Tanigan PAK | | |
| | 1 | Sodium formate•2H$_2$O | 20 | |
| | 0.5 | Sodium bicarbonate | | |
| | 0.5 | Sodium bicarbonate | 120 | Check, drain |
| Wash | 300 | water@35° C. | | |
| Retan | 100 | water@40° C. | 120 | |
| | 6 | RT Comparative A | | |
| | 6 | RT Comparative B | | |
| | 2/4/6/8 | RT Examples 2-5 respectively | | |
| | 3 | Tanigan BN | 20 | |
| | 6 | Tara | | |
| | 2 | Tanigan F | 60 | |
| | 3 | Baygenal Blank TD | | |
| Add | 50 | water@50° C. | | |
| | 3 | Levotan L | 20 | |
| | 5 | Eureka 950R | 60 | |
| | 10-25 | 10% HCOOH @RT | 30 | pH < 3.6, drain |
| Wash | 300 | Water@25° C. | 5 | |
| Wash | 300 | Water@25° C. | 5 | |

After applying the retanning formulation above to the chrome-free glutaraldehyde tanned leather, a visual and testing assessment was conducted and the results are shown below.

TABLE 3

Retanned Leather Assessment

| Sample | Softness (BLC) | Softness (handling) | Thickness (%) | Fullness | Dye Intensity |
|---|---|---|---|---|---|
| RT Comp A | 2.6 | 2.8 | 18.6 | 3.3 | 3.0 |
| RT Comp B | 2.8 | 3.0 | 20.0 | 3.3 | 3.0 |
| RT Ex. 2 | 2.7 | 3.1 | 19.7 | 3.8 | 3.5 |
| RT Ex. 3 | 2.6 | 2.9 | 21.8 | 3.5 | 4.0 |
| RT Ex. 4 | 2.3 | 2.5 | 22.0 | 3.8 | 4.0 |
| RT Ex. 5 | 2.1 | 2.0 | 20.7 | 4.0 | 4.0 |

Higher rank, better performance—(1 worst-6 best).

The retanned leathers of Table 3 are also referred to as Crusts 1-6 respectively, which are used in later examples.

Results show that leathers containing greater than 2% of an amphoteric retanning polymer provided leathers with better thickness, fullness, dye value than the controls of an acrylic acid polymer and the blank. The leathers containing lower than 4% of an amphotric retanning polymer provided leathers with similar softness to the controls, but a bit of less softness than the controls when applied in an amount greater than 4%.

POLYMERIC OVERCOAT EXAMPLES

Base polymers (BP) are used to prepare polymeric overcoat formulations.

BP Example 6: Preparation of 90(94.5BA/3.3AA/2.2PEM)//10MAA Emulsion Polymer with Zinc A 4-necked round bottom flask equipped with a mechanical stirrer and reflux condenser was charged with DI water (732.4 g) and heated to 45° C. A first monomer emulsion containing DI water (92.8 g), Sodium lauryl sulfate (24.8 g, 28% active), Sodium dodecylbenzene sulfonate (25.6 g, 22.5% active), butyl acrylate (550.0 g), acrylic acid (19.4 g) and phosphoethyl methacrylate (12.5 g) was prepared separately. The entire monomer emulsion was added and rinsed to the reactor and then sequentially were added solutions of iron sulfate (0.004 g in 4.3 g water), ammonium persulfate (0.41 g in 6 g water) and Lykopon/sodium hydroxide (0.68 g/0.12 g in 14 g water) at which time an exotherm to 87° C. was observed. After the reaction peaked the contents were cooled to 65° C. and then methyl methacrylate (61.6 g) was charged to the reactor. Solutions of t-butylhydroperoxide (0.28 g in 4 g water) and sodium sulfoxylate formaldehyde (0.18 g in 12 g water) were added and an exotherm to 63° C. was observed. Additional solutions of t-butylhydroperoxide (0.92 g in 21.6 g water) and sodium sulfoxylate formaldehyde (0.62 g in 21.6 g water) were added to reduce residual monomers. Ammonium hydroxide (1.54 g) was added to the reactor. A slurry made from DI water (34 g) and zinc oxide (9.86 g) was added over 15 minutes. The reactor contents were held at 40° C. for 1 h then additional ammonium hydroxide (15 g) was added. The resulting emulsion had a solids content of 34.4% and a pH of 8.9.

BP Comparative Example C: Preparation of 80(94.1BA/3.4AA/2.5PEM)//20MAA Emulsion Polymer without Zinc A 4-necked round bottom flask equipped with a mechanical stirrer and reflux condenser was charged with DI water (757.5 g) and heated to 35° C. A first monomer emulsion containing DI water (200.9 g), Sodium lauryl sulfate (23.2 g, 28% active), Sodium dodecylbenzene sulfonate (23.3 g, 22.5% active), butyl acrylate (598.45 g), acrylic acid (21.75 g) and phosphoethyl methacrylate (16 g) was prepared separately. A portion of the monomer emulsion (216.5 g) was added to the reactor and then sequentially were added solutions of iron sulfate (0.01 g in 2.5 g water), ammonium persulfate (0.16 g in 15 g water) and Lykopon (0.31 g in 15 g water) at which time an exotherm to 56° C. was observed. After the reaction peaked the contents were cooled to 46° C. and the remainder of the monomer emulsion added quickly. To this mixture were added additional solutions of ammonium persulfate (0.46 g in 15 g water) and Lykopon (0.78 g in 15 g water) and the reaction exothermed to 79° C. After this reaction, residual monomers were reduced by adding solutions of t-butylhydroperoxide (0.35 g in 5 g water) and sodium formaldehyde sulfoxylate (0.18 g in 15 g water). The reaction contents were cooled to 64° C. and then methyl methacrylate (155 g) was charged to the reactor. Solutions of t-butylhydroperoxide (0.71 g in 10 g water) and Bruggolite FF6 (0.54 g in 20 g water) were added and an exotherm to 74° C. was observed. Additional solutions of t-butylhydroperoxide (1.17 g in 20 g water) and FF6 (1.02 g in 22.5 g water) were added to reduce residual monomers. A solution made from DI water (187.5 g), sodium lauryl sulfate (85.1 g, 28% active) and triethylamine (21.4 g) was added over 45 minutes. The resulting emulsion had a solids content of 34.6% and a pH of 7.2.

BP Comparative D is an 80(96.5BA/3.5AA)//20MMA multistage emulsion polymer without zinc added. BP Example 7 is a 90(96.5BA/3.5AA)//10MMA multistage emulsion polymer with zinc added in the same amount as in BP Example 6. The use of "//" denotes a multistage polymerization process.

Preparation of Polymeric Overcoat Formulations:

Into a 250 milliliter plastic paint container 68 grams of water, 32 grams of EUDERM Nappa soft s, 60 Grams of EUDERM SN-02, 40 grams of EUDERM Black BN, a total of 200 grams of binder dispersion(s) and ACRYSOL RM-1020 were sequential added, with mixing using a 3 prong mixing blade, to obtain a #2 zahn cup viscosity of at least 15 seconds. In one formulation (example x) 30 grams of acrylic bead dispersion was added after the binder was added. The basecoat formulations were passed through a 125 µm filter prior to spray application.

Application of Polymeric Overcoat (Basecoat) onto the Leather Substrates:

Leather swatches (11.3×3.5 cm) of each of the leather substrate preparations were aligned in a side to side fashion and attached to a single 12"×12" (0.0929 m$^2$) mylar sheet using double sided tape with the grain side of the leather facing away from the mylar sheet. Basecoat was spray applied to the leather to achieve a dry add-on of 32.3-53.8 dry grams basecoat per square meter of leather. The leather was dried in a 90° C. oven for at least 4 minutes.

TABLE 4

K-values pf Polymer Bead (multiple stage 4.5 micron acrylic bead)

| Material | K(10), N/m2 | K(0) full compression (N/m2) | Ratio of K0/K10 |
|---|---|---|---|
| Polymer Bead | 1.20E+10 | 4.12E+10 | 3.43 |

Polymer bead sample was evaluated using a compression rate of 0.79 gram-force/sec

TABLE 5

Polymeric overcoat formulations (PO Form)

| | PO Form 1 | PO Form 2 | Comparative PO Form 3 | PO Form 4 | PO Form 5 | Comparative PO Form 6 |
|---|---|---|---|---|---|---|
| Product | PUD + AC + Zn | AC + Zn | PUD + AC | PUD + AC + Zn + bead | AC + Zn + PEM | AC + PEM |
| Water | 68 | 68 | 68 | 68 | 68 | 68 |
| Euderm Nappa Soft S | 32 | 32 | 32 | 32 | 32 | 32 |
| Euderm Duller SN-02 | 60 | 60 | 60 | 60 | 60 | 60 |
| Black BN | 40 | 40 | 40 | 40 | 40 | 40 |
| BP Comp C | | | | | | 200 |
| BP Comp D | | | 120 | | | |
| BP Ex 7 | 120 | 200 | | 120 | | |
| BP Ex 6 | | | | | 200 | |
| Bayderm bottom PR MX | 80 | 0 | 80 | 80 | | |
| 4.5 micron acrylic bead (32% solids emul.) | | | | 30 | | |
| RM-1020 | 4.8 | 3.5 | 7.8 | 3.7 | 3.8 | 8.0 |
| Total | 404.8 | 403.5 | 407.8 | 433.7 | 403.8 | 408 |

PUD—polyurethane dispersion,
AC—acrylic emulsion polymer,
PEM—phosphoethyl methacrylate in the AC,
Zn—zinc,
bead—acrylic bead

TABLE 6

Visual assessment of coated leather for Naturalness after apply

| Crust | Crust type | PO Form 1 | PO Form 2 | Comp PO Form 3 | PO Form 4 | PO Form 5 | Comp PO Form 6 |
|---|---|---|---|---|---|---|---|
| 1 | blank | 5 | 9 | 7 | 5 | — | — |
| 2 | 6% Leukotan 970 | 3 | 4 | 3 | 3 | — | — |
| 3 | 2% Ex 1 | 6 | 4 | 3 | 6 | — | — |
| 4 | 4% Ex 1 | 7 | 7 | 4 | 8 | — | — |
| 5 | 6% Ex 1 | 7 | 5 | 3 | 8 | 8 | — |
| 5 | 6% Ex 1 | — | — | — | — | — | 3 |
| 6 | 8% Ex 1 | 7 | 5 | 3 | 8 | — | — |

Assessment for "naturalness" 1-10, 1 = covered and 10 = natural

Results show that leathers containing 2% or greater of an amphoteric retanning polymer over coated with a basecoat coating of an acrylic polymer containing zinc provides improved natural appearances as compared to controls containing an anionic retanning polymer.

TABLE 7

Visual assessment of coated leather for even appearance after applying basecoat

| Crust | Crust type | PO Form 1 | PO Form 2 | Comp PO Form 3 | PO Form 4 | PO Form 5 | Comp PO Form 6 |
|---|---|---|---|---|---|---|---|
| 1 | Blank | 2 | 2 | 2 | 2 | — | — |
| 2 | 6% Leukotan 970 | 6 | 6 | 6 | 6 | — | — |
| 3 | 2% Ex 1 | 7 | 7 | 7 | 7 | — | — |
| 4 | 4% Ex 1 | 8 | 8 | 8 | 8 | — | — |
| 5 | 6% Ex 1 | 8 | 8 | 8 | 8 | 8 | — |
| 5 | 6% Ex 1 | — | — | — | — | — | 6 |
| 6 | 8% Ex 1 | 8 | 8 | 8 | 8 | — | — |

Visual Even-ness assessment: 1-10 1 = poor and not an even distribution of coating across area (deeper penetration-dryer) and 10 = very even distribution of coating over the leather article.

Results show that leathers containing 2% or greater of an amphoteric retanning polymer over coated with a basecoat provide improved natural appearance than a comparative control containing an anionic retanning polymer and significantly better than a comparative control that contains no retanning polymer.

TABLE 8

Dry adhesion of coating to crust (coatings on crust 5)

| | PO Form 2 | PO Form 5 | Comp PO Form 6 |
|---|---|---|---|
| Weight force at adhesion failure (grams) | 1350 | 1837 | 967 |
| Standard Deviation (grams) | 215 | 153 | 208 |

We claim:

1. A method for forming chrome-free retanned leather comprising:
   (a) preparing a chrome-free tanned leather hide;
   (b) contacting the chrome-free tanned leather with a retanning mixture comprising from 2% to 15%, by solids weight, based on the wet weight of the chrome-free tanned leather hide, of an amphoteric polymer composition comprising amine functional units and acid functional units; and
   (c) applying a polymeric overcoat containing an acrylic copolymer with one or more metal transition elements, with a thickness of no greater than 100 microns, to the retanned leather wherein the polymeric overcoat further comprises polyurethane.

2. The method of claim 1 wherein the composition used to prepare a chrome-free tanned leather hide comprises glutaraldehyde.

3. The method of claim 1 wherein the amphoteric polymer composition comprises at least 10%, based on the dry weight of the polymer composition, of one or more amine functional monomers, in polymerizable form; and at least 10%, based on the dry weight of the polymer composition, of one or more acid functional monomers, in polymerizable form.

4. The method of claim 1 wherein the amphoteric polymer composition has a weight average molecular weight (Mw) of 15,000 or less, as determined by size exclusion chromatography; and has no more than 25%, by weight based on the dry weight of the polymer composition, of an oligomer having a weight average molecular weight (Mw) of 1000 or less, as determined by size exclusion chromatography.

5. The method of claim 1 wherein the acrylic copolymer of the polymeric overcoat contains phosphorus acid monomer units copolymerized therein.

6. The method of claim 5 wherein the phosphorus acid monomer units are in the range of greater than 0 to 5% by weight of the acrylic copolymer.

7. The method of claim 1 wherein the metal transition element in the polymeric overcoat is zinc.

8. The method of claim 1 wherein the polymeric overcoat further comprises from 5 to 20% by weight based on the solid content of the polymeric overcoat, of organic, solid spherical particle beads with a particle size of 3 to 10 microns, as measured using a Disc Centrifuge Photosedimentometer.

9. A chrome-free retanned leather formed by the method of claim 1.

10. A method for forming chrome-free retanned leather comprising:

(a) preparing a chrome-free tanned leather hide;
(b) contacting the chrome-free tanned leather with a retanning mixture comprising from 2% to 15%, by solids weight, based on the wet weight of the chrome-free tanned leather hide, of an amphoteric polymer composition comprising amine functional units and acid functional units; and
(c) applying a polymeric overcoat containing an acrylic copolymer with one or more metal transition elements, with a thickness of no greater than 100 microns, to the retanned leather wherein the acrylic copolymer of the polymeric overcoat contains phosphorus acid monomer units copolymerized therein.

11. The method of claim 10 wherein the phosphorus acid monomer units are in the range of greater than 0 to 5% by weight of the acrylic copolymer.

12. The method of claim 10 wherein the metal transition element in the polymeric overcoat is zinc.

13. The method of claim 10 wherein the composition used to prepare a chrome- free tanned leather hide comprises glutaraldehyde.

14. The method of claim 10 wherein the amphoteric polymer composition comprises at least 10%, based on the dry weight of the polymer composition, of one or more amine functional monomers, in polymerizable form; and at least 10%, based on the dry weight of the polymer composition, of one or more acid functional monomers, in polymerizable form.

15. The method of claim 1 wherein the polymeric overcoat further comprises from 5 to 20% by weight based on the solid content of the polymeric overcoat, of organic, solid spherical particle beads with a particle size of 3 to 10 microns, as measured using a Disc Centrifuge Photosedimentometer.

16. A method for forming chrome-free retanned leather comprising:
(a) preparing a chrome-free tanned leather hide;
(b) contacting the chrome-free tanned leather with a retanning mixture comprising from 2% to 15%, by solids weight, based on the wet weight of the chrome-free tanned leather hide, of an amphoteric polymer composition comprising amine functional units and acid functional units; and
(c) applying a polymeric overcoat containing an acrylic copolymer with one or more metal transition elements, with a thickness of no greater than 100 microns, to the retanned leather, wherein the polymeric overcoat further comprises from 5 to 20% by weight based on the solid content of the polymeric overcoat, of organic, solid spherical particle beads with a particle size of 3 to 10 microns, as measured using a Disc Centrifuge Photosedimentometer.

17. The method of claim 16 wherein the metal transition element in the polymeric overcoat is zinc.

18. The method of claim 16 wherein the composition used to prepare a chrome- free tanned leather hide comprises glutaraldehyde.

19. The method of claim 16 wherein the amphoteric polymer composition comprises at least 10%, based on the dry weight of the polymer composition, of one or more amine functional monomers, in polymerizable form; and at least 10%, based on the dry weight of the polymer composition, of one or more acid functional monomers, in polymerizable form.

20. The method of claim 16 wherein the amphoteric polymer composition has a weight average molecular weight (Mw) of 15,000 or less, as determined by size exclusion chromatography; and has no more than 25%, by weight based on the dry weight of the polymer composition, of an oligomer having a weight average molecular weight (Mw) of 1000 or less, as determined by size exclusion chromatography.

* * * * *